United States Patent [19]
Borden et al.

[11] Patent Number: 5,982,319
[45] Date of Patent: Nov. 9, 1999

[54] UHF SYNTHETIC APERTURE RADAR

[75] Inventors: Scott C. Borden, Finksburg; George A. Ioannidis, Bel Air, both of Md.

[73] Assignee: Northrop Grumman Corporation, Los Angeles, Calif.

[21] Appl. No.: 09/041,215

[22] Filed: Mar. 12, 1998

[51] Int. Cl.⁶ .................................................. G01S 13/90
[52] U.S. Cl. ........................... 342/25; 342/162; 342/194; 342/196
[58] Field of Search .............. 342/25, 22, 159, 342/162, 195, 203, 194, 196

[56] References Cited

U.S. PATENT DOCUMENTS

| | | | |
|---|---|---|---|
| H1181 | 5/1993 | Rihaczek | 342/25 |
| 3,725,915 | 4/1973 | Herman et al. | 342/25 |
| 3,725,929 | 4/1973 | Spanos | 343/844 |
| 3,727,219 | 4/1973 | Graham | 342/25 |
| 4,155,086 | 5/1979 | Blair | 342/25 |
| 4,204,210 | 5/1980 | Hose | 342/25 |
| 4,246,585 | 1/1981 | Mailloux | 342/373 |
| 4,268,829 | 5/1981 | Baurle et al. | 342/380 |
| 4,280,128 | 7/1981 | Masak | 342/380 |
| 4,298,873 | 11/1981 | Roberts | 342/375 |
| 4,525,716 | 6/1985 | Carlin | 342/381 |
| 4,651,155 | 3/1987 | Baurle et al. | 342/378 |
| 4,771,289 | 9/1988 | Masak | 342/383 |
| 4,853,699 | 8/1989 | Easton | 342/25 |
| 5,107,273 | 4/1992 | Roberts | 342/417 |
| 5,442,364 | 8/1995 | Lee et al. | 342/372 |
| 5,489,906 | 2/1996 | McCord | 342/25 |
| 5,847,673 | 12/1998 | DeBell | 342/25 |
| 5,850,202 | 12/1998 | Goodman et al. | 342/25 |

*Primary Examiner*—John B. Sotomayor
*Attorney, Agent, or Firm*—Terry J. Anderson; Karl J. Hoch, Jr.

[57] ABSTRACT

A synthetic aperture radar (SAR) which operates at UHF frequencies and which includes a two element antenna. The SAR generates a null in the backlobe of the antenna pattern at the location of a target which is steered rather than trying to obtain directivity in the mainlobe. Both analog and digital implementations are provided. In the analog approach, required phase shifts are performed at a frequency higher than the RF output frequency and the receive and transmit nulls are steered separately to increase the width of the null so as to allow for wider SAR swaths. The digital implementation involves steering the null only on receive and multiplying fast time samples by a complex phase correction similar to that used in the analog approach to form the beam. The phase correction is also performed prior to range resolution which employs "stretch" processing, so as to achieve high range resolution.

14 Claims, 5 Drawing Sheets

UHF SYNTHETIC APERTURE RADAR

BACKGROUND OF THE INVENTION

1. Field of the Invention

This invention relates generally to synthetic aperture radar (SAR) including adaptive signal processing, and more particularly to a foliage penetrating SAR mapping system which operates in the UHF frequency band.

2. Description of Related Art

The principle of synthetic aperture radar (SAR) mapping is well known and comprises a radar system, which is carried by an aircraft traversing a particular area of interest and is typically used for ground mapping. The frequencies and accordingly the wavelengths normally used by such radar systems such as Ku-band, are substantially if not entirely blocked by ground foliage, i.e. trees and brush.

While there is a current need for a compact foliage penetrating radar, relatively long wavelengths, e.g. UHF, are required and must be combined with high resolution which require wide bandwidth. Such a capability would be most welcome in applications requiring reconnaissance or destroy missions to be performed by unmanned aircraft. Such a mission could reveal concealed equipment e.g. tanks, trucks and weaponry which is at present prevented from being detected by SAR mapping radar equipment operating, for example, in the Ku-band. While one such Ku-band SAR system radar is presently known and which is mounted in an aircraft known as an unmanned air vehicle (UAV), there is a limited space, particularly for the antenna in a UAV. In order for such an aircraft to act as a platform for a UHF SAR, an antenna is required that operates across a very large fractional bandwidth and must be small and light enough to fit in the space presently allocated for the existing antenna system.

At present there is no known antenna or SAR system that will fit in the nose portion of a relatively small unmanned reconnaissance vehicle that has the capability of penetrating foliage so as to detect targets which are obscured by trees, underbrush and other types of foliage.

SUMMARY

Accordingly, it is an object of the present invention to provide an improvement in synthetic aperture radar (SAR) apparatus.

It is a further object of the invention to provide a UHF SAR system that provides the required directivity and fractional bandwidth for synthetic aperture radar mapping.

It is another object of the invention to provide a SAR which operates at UHF frequencies so as to penetrate foliage.

And it still yet another object of the invention to provide a UHF SAR system that provides sufficient directivity so that the radar return from the antenna backlobe is relatively small relative to the mainlobe.

The foregoing and other objects are achieved by a synthetic aperture radar (SAR) which operates at UHF frequencies and which includes a two element antenna. The SAR generates a null in the backlobe of the antenna pattern at the location of a target which is steered rather than trying to obtain directivity in the mainlobe. Both analog and digital implementations are provided. In the analog approach, required phase shifts are performed at S-band so as to simplify hardware and then down converted in frequency. Both receive and transmit nulls are steered separately to increase the width of the null to allow for wider SAR swaths. The digital implementation involves steering the null on receive and multiplying fast time samples by a complex phase correction similar to that used in the analog approach to form the beam. The phase correction is also performed prior to range resolution which employs "stretch" processing, so as to achieve high range resolution.

Further scope of applicability of the present invention will become apparent from the detailed description provided hereinafter. It should be understood, however, that the detailed description of the preferred embodiments described herein are given by way of illustration only, since various changes and modifications coming within the spirit and scope of the invention will become apparent to those skilled in the art.

BRIEF DESCRIPTION OF THE DRAWINGS

The present invention will become more fully understood when considered together with the accompanying drawings which are provided by way of illustration only, and thus are not considered to be limitative of the invention, and wherein.

DETAILED DESCRIPTION OF THE INVENTION

There are many applications for a compact, foliage penetrating radar. As noted above, the penetration of foliage requires long wavelengths which occur at UHF frequencies, for example in the range of 200–600 MHz.

This invention is directed to a configuration for a small aperture radar that provides the required directivity and fractional bandwidth for providing synthetic aperture (SAR) mapping. The present invention, moreover, is directed to an improvement in SAR radar technology which operates at UHF frequencies so as to permit targets to be detected in trees and other foliage.

While a tactical endurance SAR (TESAR) has been developed by the assignee of this invention which is located in a UAV, limited space is provided for the TESAR system in such a platform. In order to install a UHF SAR in place of a TESAR, an antenna is required that operates across a very large fractional bandwidth, for example, 220 to 580 MHz. Moreover, the antenna must be small and light enough to be mounted in a relatively small space. Ideally this antenna should be substantially of the same size and shape as a TESAR system so that a foliage penetrating SAR such as will be described hereinafter, can be interchanged with a TESAR.

There is no antenna presently available that is of the necessary size that will provide adequate bandwidth and provide sufficient directivity so that the radar return from the antenna backlobe would be relatively small, in the order of −40 dB, relative to the radar return in the mainlobe of the antenna pattern.

The solution to the problem is to utilize a two element phased array antenna and generate a null across the full operating bandwidth in the backlobe of the antenna pattern at the map location rather than trying to obtain directivity in the mainlobe. This complements normal SAR processing which provides discrimination in both range and angle. The present invention is directed to both analog and digital implementations for forming a null that is positionable on the ground and which can be kept stable over the full operating bandwidth of the radar.

Figure 1:
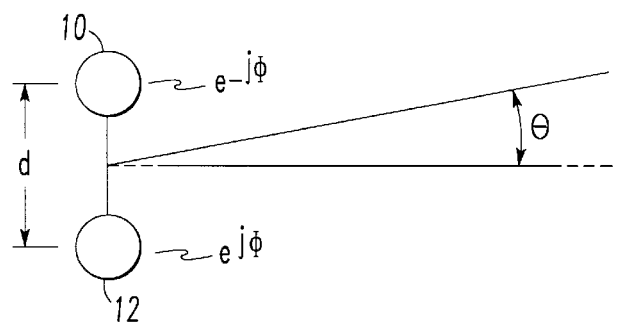
FIG. 1 is a simplified diagram typically illustrative of a basic two element phased array antenna used in connection with the subject invention.

Accordingly, in FIG. 1 two UHF antenna elements 10 and 12 are shown having a spacing d =6 to 12 inches. In accordance with the subject invention, a "steering" phase is applied at the radiators 10 and 12 of an angle $\phi$ to one element and −$\phi$ to the other. This is shown in FIG. 1 by the signals $e^{-j\Phi}$ and $e^{j\Phi}$ being applied to elements 10 and 12. The conventional approach is to generate phase commands $\phi$ which implement the equation:

$$\Phi = \pi d \sin \theta / \lambda \quad (1)$$

where $\theta$ comprises the target angle of the mainlobe, and $\lambda = c/f$, where c is the speed of light and f is the frequency of the phase command signal.

A 6–12 inch spacing, however, is very small compared to the wavelength at the low end of the UHF band, i.e. in the region of 220 MHz to 580 MHz and will not provide the required directivity.

Rather than trying to form and steer a beam, the present invention is directed to apparatus that generates phase commands $\Phi$ which operate to steer a null according to the equation:

$$\phi = \pi/2 - \pi d \sin\theta/\lambda \quad (2)$$

Figure 2:
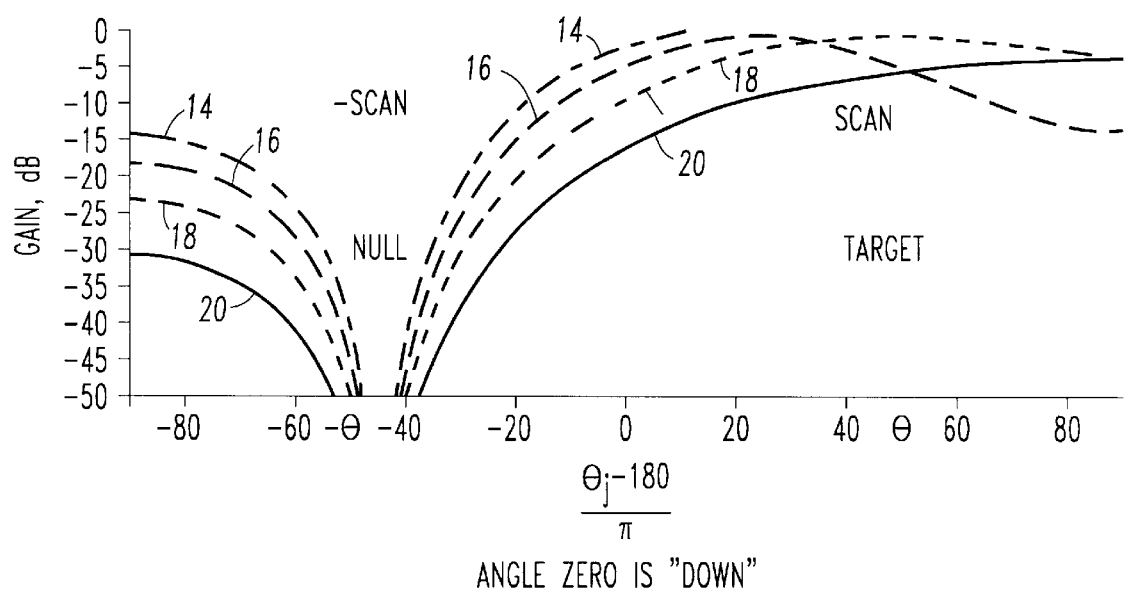
FIG. 2 is illustrative of a two way antenna pattern having a null generated in the backlobe in accordance with a first embodiment of the subject invention.

With such a phase command, a null can be placed at an angle equal to −$\theta$ such as shown in FIG. 2.

FIG. 2, moreover, shows four two way antenna patterns 14, 16, 18 and 20 for frequencies of 220, 340, 460 and 580 MHz, respectively, for a two element array as shown in FIG. 1, having a d =10 inches element spacing.

In the antenna pattern shown in FIG. 2, the antenna is physically pointing straight "down". The desired mapping location is at a squint angle of $\theta=+45°$, and where the required null is at $\theta=-45°$. The plot, moreover, indicates that a null in excess of 40 dB is readily attainable, having a width of 5–10°. It should be noted that for "beam steering", phase commands are approximations of ideal time delay steering. This, however, does not apply to null steering. Either variable phase or a fixed time delay plus a fixed phase shift are required for null steering.

Analog phase shifters are inherently inaccurate in the UHF range of, for example, from 220 to 580 MHz.

This occurs because the bandwidth is excessive. This limitation is overcome in the subject invention by implementing phase shifts at S-band in the region of 3 GHz, where the fractional bandwidth is sufficiently low that analog phase shifters are available.

Figure 3:
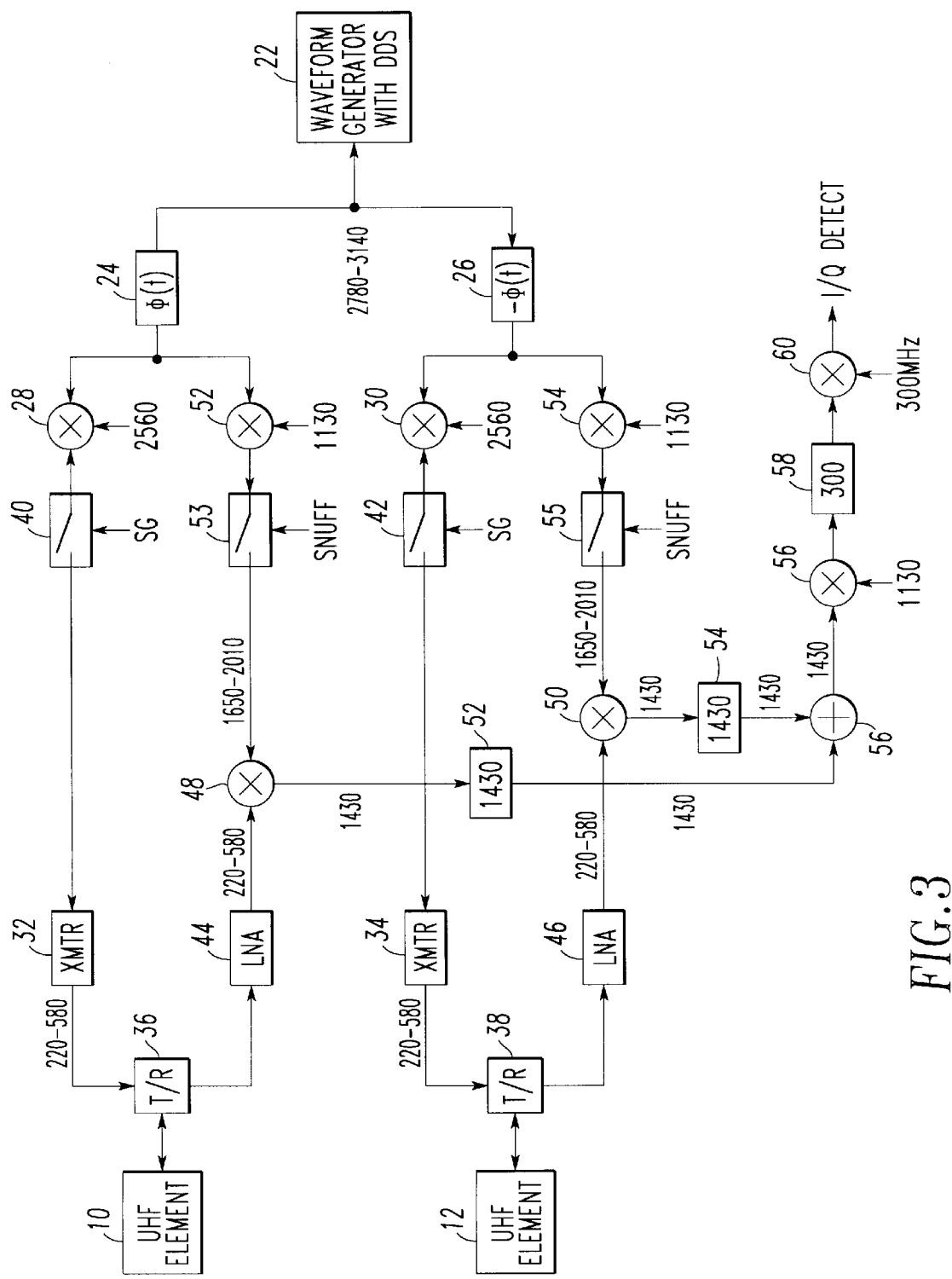
FIG. 3 is an electrical block diagram illustrative of a first or analog embodiment for steering a null shown in FIG. 2.

Referring now to a first embodiment of this invention and which comprises an analog approach, reference is made to FIG. 3. Reference numeral 22 denotes a waveform generator employing direct digital synthesis (DDS) and one which provides a signal varying in frequency from 2780 to 3140 MHz and which varies in a linear fashion so as to produce a "chirp" frequency spectrum. The output signal from the waveform generator 22 is split as shown and is applied to two separate phase shifters 24 and 26, with one phase shifter 24 providing the phase shift $\phi$ in one leg, while the other phase shifter 26 provides the phase shift −$\phi$ in the other leg. The phase shifts $\phi$ (t) and −$\phi$ (t) can be achieved using any number of different types of "rotating" phase shifters, one typical example being the Fox phase shifter.

These two signals are now reduced in frequency to produce UHF RF outputs ranging between 200–580 MHz by being fed to respective signal mixers 28 and 30, which also receive 2560 MHz fixed frequency inputs from a local signal source, not shown. The UHF outputs of the mixers 28 and 30 are fed to respective RF transmitter sections 32 and 34, where RFs having phase shifts of $\phi$ and −$\phi$ are radiated from the antenna elements 10 and 12 via the transmit/receive (T/R) devices 36 and 38. Transmitter disabling switches 40 and 42 are further shown connected between mixer 28 and transmitter 32 and mixer 30 and transmitter 34.

On receive, reflected energy impinging on the antenna elements 10 and 12 are respectively fed to low noise amplifiers (LNA) 44 and 46. The amplified receive UHF signals at 220–580 MHz are fed to a second pair of mixers 48 and 50, which additionally receive respective signals ranging from 1650–2010 MHz from a third pair of mixers 52 and 54. The mixers 52 and 54 both receive an 1130 MHz fixed frequency signal also from a local signal source, not shown, along with the 2780–140 MHz output from the waveform generator 22.

Both mixers 48 and 50 output an up converted IF frequency of 1430 MHz where they are amplified in amplifiers 52 and 54 and then are added together by means of a signal adder 56. The added 1430 MHz signal from the adder 56 is fed to another mixer 56 which also receives a fixed frequency signal of 1130 MHz from the source feeding mixers 52 and 54 and where there is outputted therefrom a second IF signal having a fixed frequency of 300 MHz. This signal is amplified in amplifier 58 and then fed to yet another mixer 60 which also receives a fixed frequency input of 300 MHz. A video signal is output from the mixer 60 which is then processed in apparatus, not shown, but well known to those skilled in the art to provide both in-phase (I) and quadrature (Q) component signals which are then subjected to further signal processing.

Since the transmit and receive functions are separate in the configuration shown in FIG. 3, a different null can be formed on transmit and receive. Such an approach can operate to broaden the useful portion of the null. With such an approach, a −40 dB having a width of at least 10° can be generated.

Figure 4:
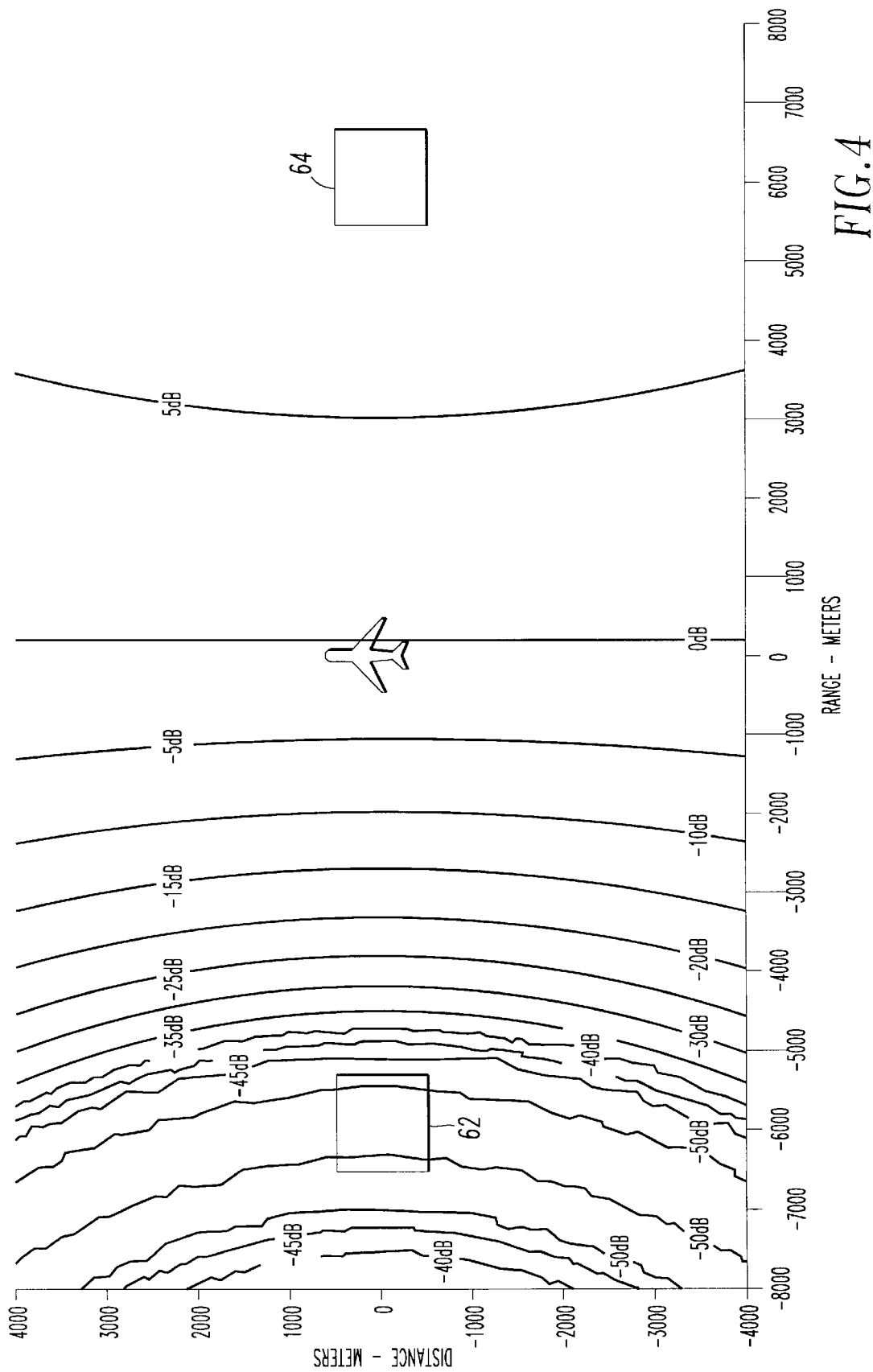
FIG. 4 is illustrative of the ground footprint of a null that is broadened by steering the transmit and receive nulls separately.

The null patterns of FIG. 2 can be translated from space angles into a projection on the ground. FIG. 4, for example, is illustrative of a ground footprint of a null that has been broadened by steering the transmit and receive nulls separately. As such, a null in the order of −50 dBm can be generated in the backlobe 62 relative to the target area in the mainlobe 64 and can be accomplished by steering the null rather than the main beam.

While the aforementioned concept contemplates steering the transmit and receive nulls separately, hardware simplification can be achieved by eliminating the null steering on transmit and performing the null formation entirely on receive. Such an implementation would be provided, for example, by the embodiment shown in FIG. 5 and which comprises a digital approach implemented in software.

Figure 5:
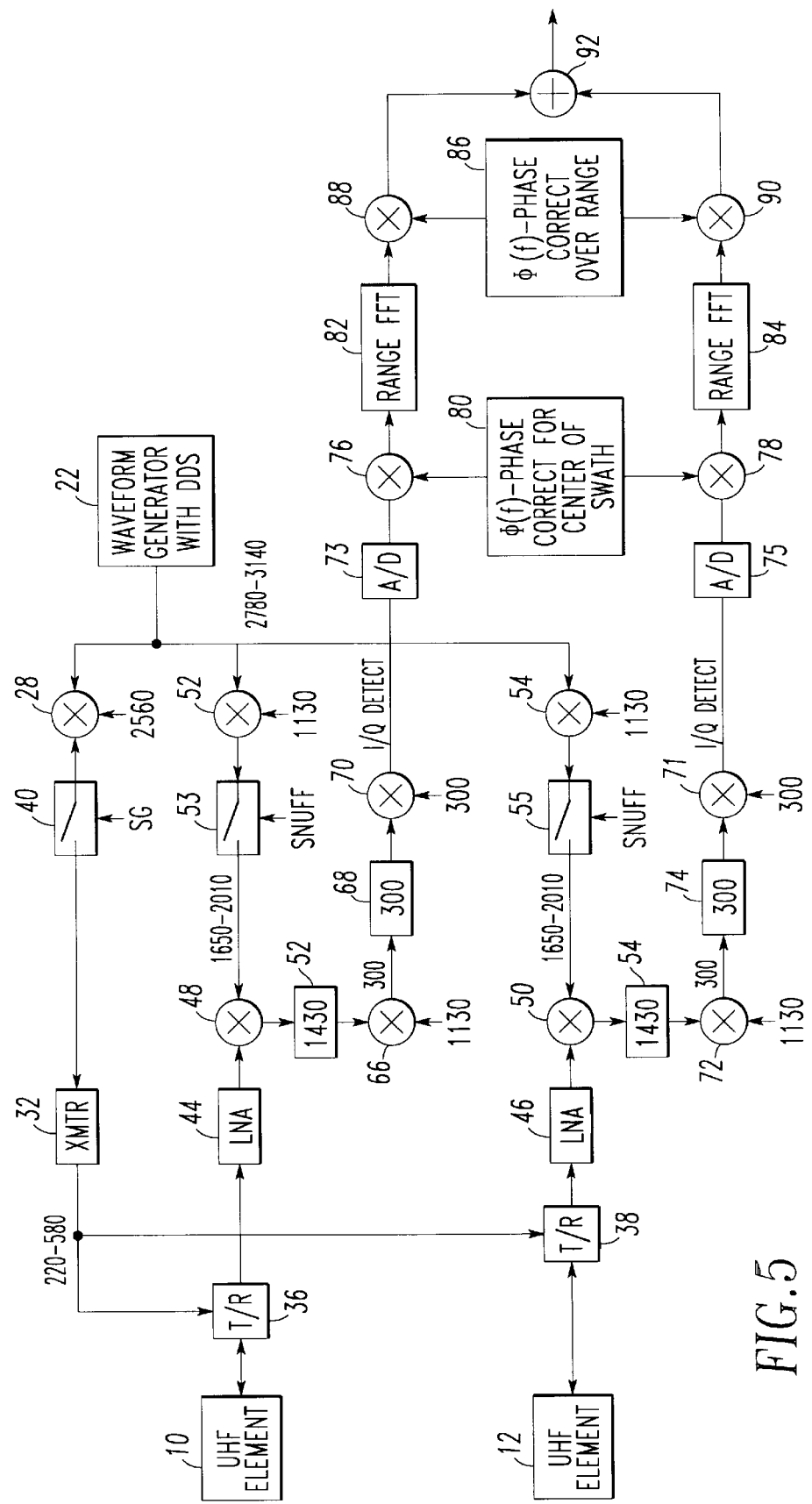
FIG. 5 is an electrical block diagram illustrative of a second or digital embodiment of the subject invention.

As shown in FIG. 5, the receiver/exciter portion of the system is similar to the embodiment shown in FIG. 3, with the exception that now both elements 10 and 12 are excited from the same transmitter antenna section 32. On receive, the embodiment of FIG. 5 resembles that of FIG. 3 up to the mixers 48 and 50 and the IF amplifiers 52 and 54. Now instead of summing the two 1340 MHz IF signals, the IF signal from the amplifier 52 is mixed with an 1130 MHz signal in a mixer 66 to output a first difference signal of 300 MHz as a second IF signal. This signal is then applied to a second IF amplifier 68, whose output is fed to the mixer 70. The mixer 70 mixes the second IF signal of 300 MHz with another 300 MHz to provide a first video output signal.

In a like manner, the IF signal fed from the amplifier 54 is fed to a mixer 72 which also receives an 1130 MHz which outputs another second IF signal of 300 MHz. This signal is then applied to a second IF amplifier 74. The output of second IF amplifier 74 is fed to mixer 71 which also receives a 300 MHz signal in the same fashion as mixer 70 so as to provide a second video signal.

Both video signals from mixers 70 and 71 and consisting of in phase (I) and quadrature (Q) components are A/D converted by converters 73 and 75 and multiplied by a complex correction of phase φ (f) to provide a first phase correction in a pair of multipliers 76 and 78 for correcting for center of the swath of the radiation pattern while the data is still in the frequency domain. The magnitude of the phase correction is controlled by a phase controller 80. Next FFT processing is applied while the data is still in the frequency domain as shown by reference numerals 82 and 84 for providing range resolution. A second phase correction for range is next applied by means of a phase controller 86 applying phase correction signals of φ (r) to both receiver channels by respective multipliers 88 and 90. Finally, the two channel signals are summed together in an adder 92 where a composite digital signal is outputted for further processing.

Figure 6:
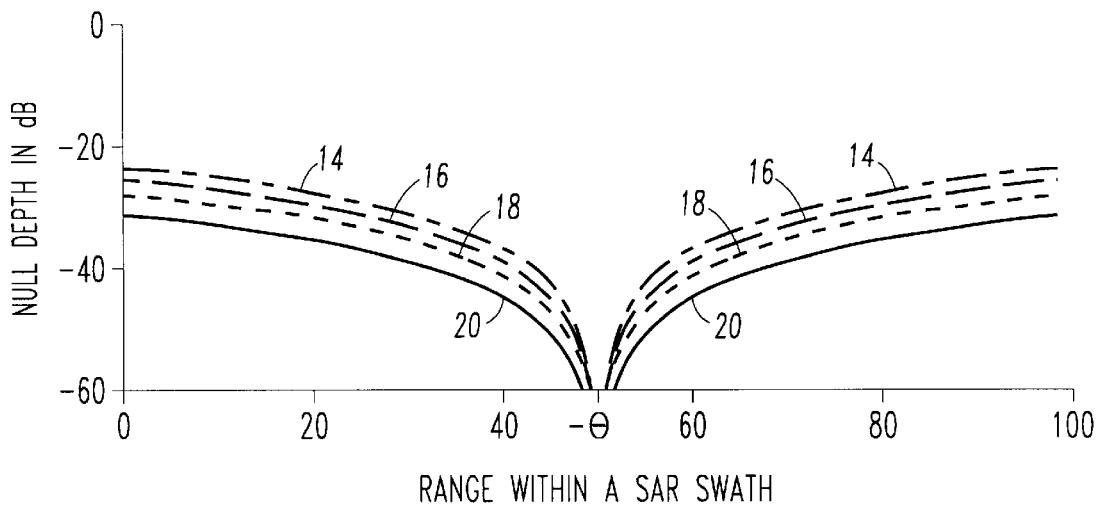
FIG. 6 is illustrative of a one way processor null formed in the receive pattern in accordance with the subject invention.

FIG. 6 is illustrative of a one way pattern obtained with an embodiment where only a first correction is made. This could be achieved by the configuration shown in FIG. 5 for four frequencies 14, 16, 18 and 20 but with elements 86, 88 and 90 in front of the adder 92 being removed from the system. In FIG. 6, the null depth across a 1 km swath obtained at 9 km slant range is shown. The desired null depth of −40 db is obtained only for a very small portion of the swath. This is because the exact phase needs to be employed as a function of both range and frequency. The processing can, at best, assume the middle range of the range swath. That is why the null is at its peak at the middle of the swath.

Figure 7:
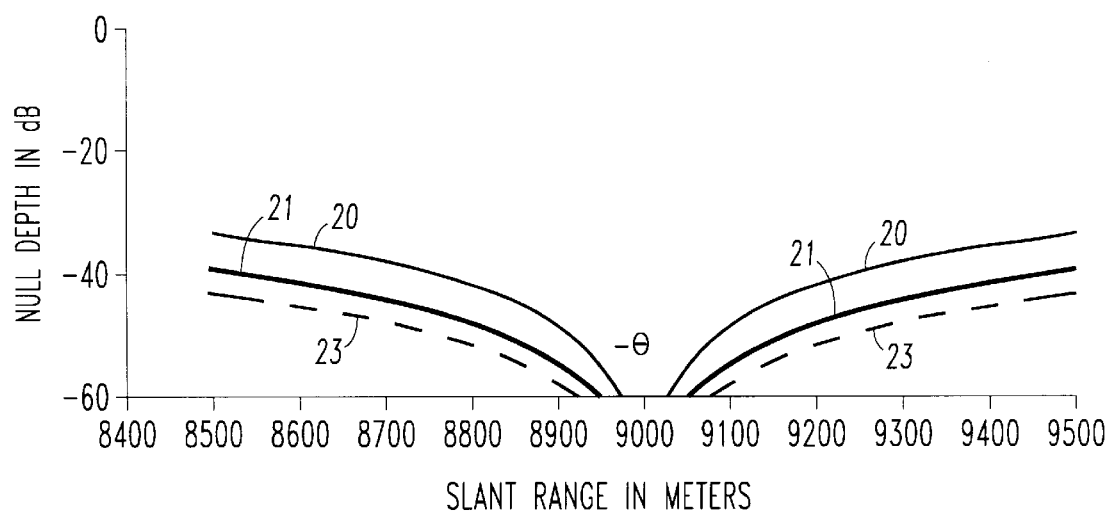
FIG. 7 is illustrative of a two stage one way processor null formed only in the receive antenna pattern in accordance with the subject invention.

When the second and range dependent correction is employed following range compression as shown in FIG. 5 including the elements 86, 88 and 90, a swath such as shown in FIG. 7 results. Although a perfect correction cannot be made at this point in the processing, range comprises a parameter which is known; however, frequency is now lost. Accordingly, a middle frequency is assumed and a range dependent correction is formed.

The advantages and disadvantages of the two embodiments described above can be summarized in the following table.

TABLE I

| Parameter | Analog Approach - FIG. 3 | Digital Approach - FIG. 5 |
|---|---|---|
| Exciter complexity | More Complex - Rotating phase shifters | Simplest - Single channel No rotating phase shifters |
| Receiver complexity | Less complex - Two channels of RF Single channel IF and SDA | More complex - Two complete channels |
| Processing | Simplest - No signal processing required | Highest - Twice as much data in processor front end |
| Null depth | Depth improved by two way gain | One way gain but can be optimized somewhat for each range gate and frequency separately |
| Risk | Higher integration and hardware | Higher software |

Having thus shown and described what is at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

We claim:

1. A method of penetrating foliage by a radar signal, comprising the steps of:

generating a steerable RF output signal in the UHF frequency range, transmitting and receiving the RF output signal for mapping the location of a ground target with said RF output signal, said RF output signal generating transmit and receive antenna patterns having a front or mainlobe and a backlobe;

generating a null in the backlobe of at least one of the antenna patterns; and steering the null in the backlobe so as to obtain directivity of the radar signal.

2. A method in accordance with claim 1 wherein said step of generating the RF output signal in the UHF frequency range comprises generating a synthetic aperture radar (SAR) signal.

3. A method in accordance with claim 2 wherein steering of the null is performed in said receive antenna pattern.

4. A method in accordance with claim 2 wherein steering of the null is performed in both said antenna patterns.

5. A method in accordance with claim 1 wherein said steering step includes generating phase commands for a phased antenna array comprised of at least two UHF antenna elements.

6. A method in accordance with claim 5 wherein said step of generating phase commands includes generating phase command signals φ according to the equation:

$$\phi = \pi 2 - \pi \cdot d \cdot \sin \theta / \lambda$$

where d is the distance between antenna elements, θ is the target angle of the mainlobe and λ= c/f, where c is the speed of light and f is the frequency of the phase command signals.

7. A synthetic aperture radar system for penetrating foliage, comprising:

an exciter circuit for generating an RF radar output signal in the UHF frequency range, a phased array antenna for transmitting and receiving said radar output signal for mapping the location of a ground target, said radar signal having a transmit antenna pattern and a receive antenna pattern, each said pattern including a front or mainlobe and a backlobe;

circuit means generating a null in the backlobe of at least one of the antenna patterns; and, circuit means steering the null in the backlobe so as to obtain directivity.

8. A radar system in accordance with claim 7 wherein the steering circuit means includes circuit means generating phase command signals $\Phi$ for said phase array antenna according to the equation:

$$\phi = \pi/2 - \pi \cdot d \cdot \sin\theta/\lambda$$

where d is the distance between antenna elements, $\phi$ is the target angle of the mainlobe, and $\lambda = c/f$, where c is the speed of light and f is the frequency of the phase command signals.

9. A system in accordance with claim 8 wherein the circuit means steering the null comprises circuit means steering the null in both said antenna patterns.

10. A system in accordance with claim 9 wherein the steering circuit means comprises an analog circuit including circuit means generating phase command signals $\phi$.

11. A system in accordance with claim 9 wherein said phase command signals $\phi$ are generated at a higher frequency than said RF output signals.

12. A system in accordance with claim 8 wherein said circuit means steering the null comprises circuit means steering the null only in the receive antenna pattern.

13. A system in accordance with claim 12 wherein said circuit means generating the null includes: analog circuitry responsive to return RF signals for generating two channels of in phase (I) and quadrature (Q) analog signals; analog to digital circuitry for converting the analog I and Q signals of both channels to digital I and Q signals; a first digital circuit for multiplying the digital I and Q signals of both channels by a center of swath phase correction and a second digital circuit for performing FFT processing for providing range resolution.

14. A system in accordance with claim 13 and additionally including, a third digital circuit for multiplying the output of the second digital circuit by another phase correction following range resolution for correcting phase as a function of range.

* * * * *